United States Patent

[11] 3,612,317

[72] Inventor Ernst Weichel
 Bahnhofstr. 1, 7326 Heiningen, Germany
[21] Appl. No. 825,598
[22] Filed May 19, 1969
[45] Patented Oct. 12, 1971
[32] Priority May 18, 1968
[33] Germany
[31] P 17 57 555.2

[54] LOADING WAGON AND CHARGING MEANS THEREFOR
 27 Claims, 18 Drawing Figs.
[52] U.S. Cl............................................. 214/519,
 56/354, 56/364, 214/83.3
[51] Int. Cl................................................. B60p 1/00
[50] Field of Search...................... 214/518–522,
 83.3; 56/364, 344, 351, 354–357;
 100/189

[56] References Cited
 UNITED STATES PATENTS
 2,603,144 7/1952 Floyd ........................... 100/189
 3,331,199 7/1967 Dechentreiter ................ 56/364

FOREIGN PATENTS
 239,705 8/1965 Austria......................... 214/519
 1,425,753 12/1965 France ......................... 56/364
 1,197,665 7/1965 Germany..................... 56/344
 459,643 7/1965 Switzerland................. 56/364

Primary Examiner—Albert J. Makay
Attorney—McGlew and Toren

ABSTRACT: A loading wagon, having a laterally chargeable conveyor duct, is provided with a substantially U-shaped guide trough, open at the top, extending laterally of the conveyor duct and including at least front and rear walls interconnected by a bottom wall. Conveyor prongs are arranged for extension into the guide trough laterally thereof, and are operable to lift material in the guide trough for discharge through the open top thereof onto the conveyor duct. The guide trough receives agricultural commodities from a harvesting implement arranged adjacent the loading wagon. Cutting means preferably are provided to sever the material in the guide trough from material being fed to the guide trough during lifting of the material by the prongs.

INVENTOR
ERNST WEICHEL

BY

McFlew & Toren
ATTORNEYS

INVENTOR
ERNST WEICHEL

BY
McGlew & Toren
ATTORNEYS

INVENTOR
ERNST WEICHEL

BY

ATTORNEYS

LOADING WAGON AND CHARGING MEANS THEREFOR

BACKGROUND OF THE INVENTION

There are known agricultural harvesters provided with laterally chargeable conveyor ducts, such as shown, for example, in German Auslegeschrift No. 1,215,996. It is also known to provide harvesting implements which move along a track parallel and adjacent the track of a loading wagon, such as shown in French Pat. No. 1,484,971, for example.

This latter arrangement operates with a harvesting element movable along a track parallel to and adjacent to the track of a trailer which pulls the loading wagon, the movement being effected in the driving direction of the tractor. This harvesting implement or element is provided with a transverse conveyor and a guide way adjoining the latter and receiving the harvesting material and feeding it to the loading device of the loading wagon. In accordance with a special embodiment of this known arrangement, a guide trough is provided adjacent the guide way and is arranged in front of or under the loading device of the loading wagon.

Although it is possible, with this arrangement, to harvest cereals and leafy vegetables laterally next to the tractor and to feed them to the loading device of the loading wagon without contact with the ground, in such a manner that the material is not only handled extremely gently but also can be picked up without the slightest soiling and in swaths of any height, the known arrangement still has some disadvantages. Among these are the fact that the tractor-drawn harvesting implement is extremely heavy and bulky and requires considerable setup time.

There has also been suggested a device, which does not form part of the prior art, for picking up and conveying harvested material from the side to a conveyor duct which is also charged from the front by a conventional receiving drum. Preferably, the outlet opening of the transverse conveyor duct of this arrangement is arranged laterally next to and behind the receiving drums of a lateral harvesting implement and of the conveyor unit, respectively, of the loading wagon and in the range of the maximum duct diameter.

Though this transverse conveyor, because the material can be conveyed in compressed form, can be built so small and handy, considering its output, that it can be used as a mounted implement on a loading wagon, it has the disadvantage that the necessary conveyance in the duct of the loading wagon, transverse to the driving direction, and thus also the distribution of the material in the loading chamber, is irregular under some working conditions in practice, without, however, causing stoppages.

SUMMARY OF THE INVENTION

This invention relates to loading wagons having laterally chargeable conveyor ducts and, more particularly, to loading wagons of this type which are free of the disadvantages of the prior art, are simple in construction, and have improved loading features, particularly for the loading of cereals and leafy vegetables.

In accordance with the present invention, such a loading wagon having a laterally chargeable conveyor duct is provided for the transfer of cereals and leafy vegetables, for example, even in compressed form, from a laterally arranged harvesting implement to the conveyor duct in a trouble-free manner. Furthermore, a uniform distribution of the harvested material, in the loading chamber of the loading wagon and between the longitudinal walls of the loading chamber, is assured. In addition, the power requirements are reduced. The invention is also directed to obtaining an even better utilization of the loading chamber, particularly for hay and straw, than is possible with known loading wagons of this type.

In accordance with the invention, a loading wagon, having a laterally chargeable conveyor duct, includes a substantially U-shaped guide trough, open at the top, and extending laterally of the conveyor duct. The guide trough has at least a rear wall, a bottom wall and a front wall, and conveyor prongs are cooperable with the guiding trough and extendable thereinto laterally to lift material in the guide trough for discharge through the opened top thereof onto the conveyor duct.

There is thus provided a specially designed loading device for loading wagons in which the material to be conveyed can be fed to the loading wagons through a harvesting implement working laterally of the loading wagon, and in which the material is preferably subjected to compression, so that a transversely conveyed material cord can fill the guide trough substantially completely in compressed form and subsequently be lifted upwardly, in the same state, into the loading chamber of the loading wagon. The transfer of the harvested cereals and leafy vegetables in compressed form from the laterally arranged harvesting equipment to the guide trough of the loading wagon is effected smoothly. Due to the design of the guide trough, the harvested material is distributed uniformly in the loading chamber of the wagon, between the left and right longitudinal walls of the latter. By virtue of this, and also because a compressed material cord is fed to the loading device of the loading wagon, a substantially better utilization of the loading chamber of the wagon is attained, particularly in the case of hay and straw.

For lifting the material in the guide trough, the conveyor prongs preferably are so controlled, in accordance with the invention, that they pass through the rear wall of the guide trough and are lifted upwardly substantially parallel to the bottom of the guide trough. Naturally, it is also possible that the prongs pass through the bottom wall of the guide trough, which latter is then designed with a slotted bottom wall.

In order to permit trouble-free lifting of the material fed into the guide trough in portions, there is further provided, in accordance with the invention, a cutting blade arranged in the range of the inlet end of the guide trough and in the range, respectively, of the conveyor prong closest to this inlet end, and this cutting blade severs the cord contained in the guide trough from that part of the material cord still connected with the transverse conveyor of the harvesting implement.

In accordance with the invention, the control of the conveyor prongs can be effected in such a manner that the velocity of movement of the prongs inside the guide trough is greater than the velocity thereof outside the guide trough. That is, during the dipping of the prongs close to the bottom wall and, during the upward part of the path of motion of the guide prongs, the velocity of movement of the prongs is greater than during retraction of the prongs from the guide trough at the end of a lifting cycle.

An object of the invention is to provide an improved loading wagon having a laterally chargeable conveyor duct.

Another object of the invention is to provide such a loading wagon including a substantially U-shaped guide trough, open at the top, and extending laterally of the conveyor duct.

A further object of the invention is to provide a loading wagon having such a guide trough and in which the guide trough has at least front and rear walls interconnected by a bottom wall.

Another object of the invention is to provide such a loading wagon with conveyor prongs extendable into the guide trough laterally thereof and operable to lift material in the guide trough for discharge through the opened top thereof onto the conveyor duct.

A further object of the invention is to provide such a loading wagon in which a cutting blade or knife is provided adjacent the entry end of the guide trough to sever material in the guide trough from material being fed toward the guide trough during lifting of the material in the guide trough to the conveyor duct.

Another object of the invention is to provide such a loading wagon in which a cord of compressed material is provided in the guide trough.

A further object of the invention is to provide such a loading wagon having a loading chamber and in which better utilization of the loading chamber is attained, particularly in the case of hay and straw.

Another object of the invention is to provide such a loading wagon in which the speed of operation of the conveyor prongs is varied during each operating cycle thereof.

For an understanding of the principles of the invention, reference is made to the following description of typical embodiments thereof as illustrated in the accompanying drawings.

DESCRIPTION OF THE PREFERRED EMBODIMENTS

Figure 1:
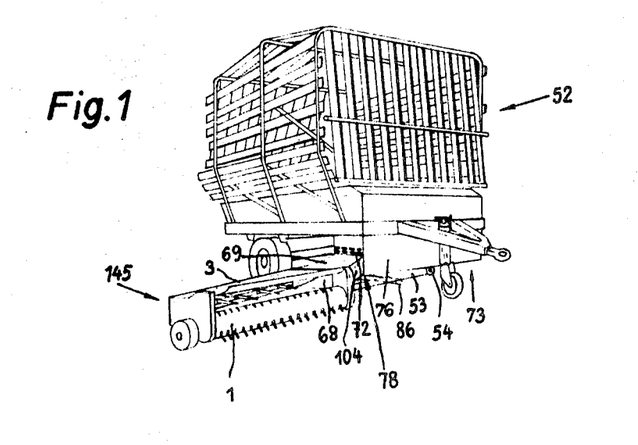
FIG. 1 is a perspective view of a loading wagon embodying the invention in operative association with a laterally arranged harvesting implement.
Figure 2:
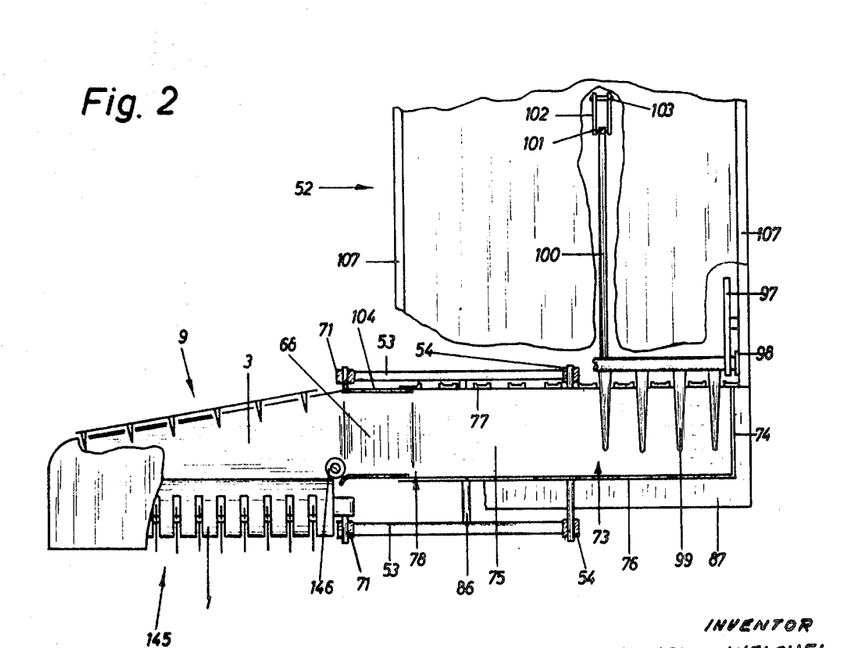
FIG. 2 is a top plan view of a part of the device shown in FIG. 1, on an enlarged scale.
Figure 3:
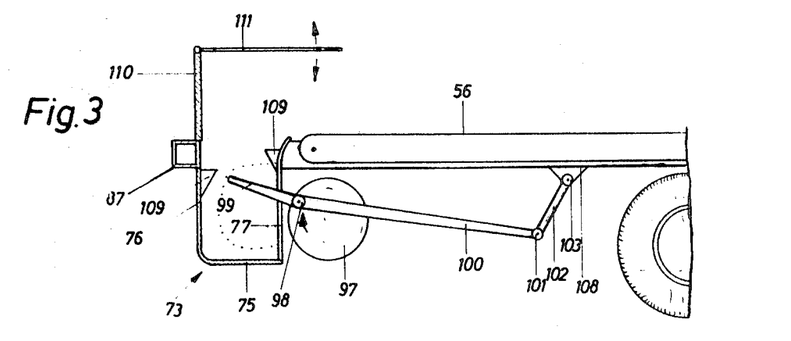
FIG. 3 is a vertical sectional view through the guide trough embodying the invention.

In the drawings, a loading wagon is indicated at 52 as having crossbeams 67 and longitudinal beams 107 (FIG. 2), wagon 52 being equipped with a scraper bottom 56 (FIG. 3). The wagon is equipped at its front side for connection to a tractor. A harvesting element 145 is secured laterally on loading wagon 52. Harvesting element 145 is shown only schematically, and has a receiving drum 1 and a transverse conveyor duct 3 provided with a transverse conveyor 9. Mounting of harvesting implement or element 145 on loading wagon 52 is effected through the medium of arms 53 and connections 54 and 71 on wagon 52, so that harvesting implement 145 can run, in the operating position, as a lateral outrigger, for example, on supporting wheels engaging the ground, with the harvesting implement having limited vertical adjustability with respect to loading wagon 52 but always maintained at a constant lateral distance therefrom.

From the driving position, implement 145 can be brought into a vertical orientation by swinging it up about the connections 71. In this position, harvesting implement 145 bears laterally on a sidewall of the loading chamber of wagon 52, but does not project beyond the maximum permissible width of the vehicle. Instead of two arms 53 connected with each other by a strut 86, a single but somewhat stronger arm could be used. Receiving drum 1 and transverse conveyor 9 are driven from loading wagon 52 by known driving means. The overall drive naturally can also be effected exclusively from a tractor connected to loading wagon 52, by hydraulic pumps or motors, likewise in a known manner.

Transverse conveyor duct 3 has an exit end which is preferably delimited by a roll 146 arranged next to, or behind, receiving drum 1, and which may be rotatable about either a vertical axis, as shown in FIG. 2, or a horizontal axis. An intermediate duct formed of plates 68, 69 and 104 is connected to the exit end of conveyor duct 3 and terminates at the inlet end 78 of a guide trough 73. Guide trough 73 has a longitudinal wall 76 secured to cross beam 87 of wagon 52, and further has a substantially horizontal bottom wall 75 and a second longitudinal sidewall 77. Sidewall 77 comprises individual strips defining slots therebetween through which prongs 99 enter into guide trough 73 from the rear, as viewed in the driving direction of wagon 52. Prongs 99 are retracted, at the end of their conveying path, from guide trough 73. An end wall 74 of guide trough 73, opposite the inlet end 78 thereof, is a closed wall. The inlet edge of bottom wall 75 is overlapped somewhat by the outlet edge of baffle plate 68, so that a trouble-free transfer of the material, issuing from the exit end of transverse conveyor duct 3, into guide trough 73 is always assured, even with varying inclined positions of baffle plate 68.

The somewhat compressed material cord, positively conveyed in the transverse conveyor duct 3, pushes the material arriving in a guide trough 73 so far ahead, as a rule and without any additional conveyor elements, that trough 73 is filled over its entire length with a uniform cord-shaped material layer.

The function of prongs or conveyor elements 99 is to pierce into the material to be conveyed as soon as guide trough 73 is filled uniformly and completely with material, in order to lift the entire material cord, in a manner similar to known loading wagons, and to push the cord upwardly out of guide trough and into the loading chamber of wagon 52. The distribution of the material in the loading chamber, as well as the height of charge or any additional compression, can be controlled in a known manner by varying the time of connection, or the speed, of scraper bottom 56 on the loading surface of wagon 52. However, these parameters are substantially improved, as compared to known loading wagons, because the material is not only additionally precompressed in guide trough 73 but also distributed uniformly over the entire width of the loading wagon. The disadvantage of some loading wagons, in that they receive relatively narrow swaths primarily only in the center of the conveyor device, so that more material arrives in the center of the loading chamber than arrives in the range of the sidewalls of the loading chamber, is thus eliminated in the arrangement of the invention.

Prongs 99 are fixedly mounted on a prong support 98 (FIG. 3) which is pivotally mounted in a pair of crank disks 97 and which is secured to a control arm 100 extending to the rear and having an articulated connection 101 to a pivoted arm 102 pivotally mounted at 103 on wagon 52.

Preferably, the conveying speed of the conveyor device in transverse conveyor duct 3, and the driving speed of loading wagon 52 relative to the amount of material picked up per unit of time, are so adjusted relative to the conveying speed of prongs 99 in guide trough 73 that a compressed material cord is conveyed from transverse conveyor duct into guide trough 73 during one revolution of crank disks 97, the length of this cord corresponding to the length of guide trough 73. Certain differences, between the conveying speed of the conveyor device in transverse conveyor duct 3 and the speed of elements 99, and differences in the amount of material supplied per unit of time, are permissible for cereals and leafy vegetables inasmuch as they can be partly compensated, in case the prongs 99 should lift the material "too late," by an additional compression of the cord of material in the guide trough. This additional compression may even be desirable.

It can be of great advantage to control the conveying speed of conveyor prongs 99 by known devices, such as, for example, curved gears or so-called break circuits, in such a way that the velocity of movement of conveyor elements 99 is as high as possible during the piercing of the material directly above the bottom wall 75 of guide trough 73, and the velocity of movement of the prongs during the upwardly directed part of the path of motion inside guide trough 3. Correspondingly, the speed of retraction of conveyor elements 99 from the upper part of guide trough 73, and the speed of the downwardly directed part of the path of movement of the prongs outside guide trough 73, are relatively low. This movement can also be interrupted by stoppage periods of the conveyor elements 99, preferably in their highest position in guide trough 73. By virtue of the above-mentioned measures, it is possible to achieve a practically uninterrupted lateral charging of material from conveyor duct 3 into guide trough 73, as well as the uniform filling of the loading chamber of wagon 52, even with varying amounts of material being loaded.

Known barbs 109 can be provided in the upper parts of the longitudinal sidewalls 76 and 77 of trough 73, or on front wall 110 (FIG. 3) of loading wagon 52. These barbs 109 prevent the lifted material cord from falling back after a conveyor prongs 99 have been retracted from guide trough 73. Instead of barbs 109, there can also be used resilient or moving barbs, or even star-type rolls (FIG. 18) which can turn only in an upward direction with respect to their portions within trough 73, as indicated by the arrows in FIG. 18.

FIG. 3 also illustrates how a part 111 of the wall 110 of the loading chamber can be lowered, when the loading device is not in use, and used to cover the upper open edge of guide trough 73.

Figure 4:
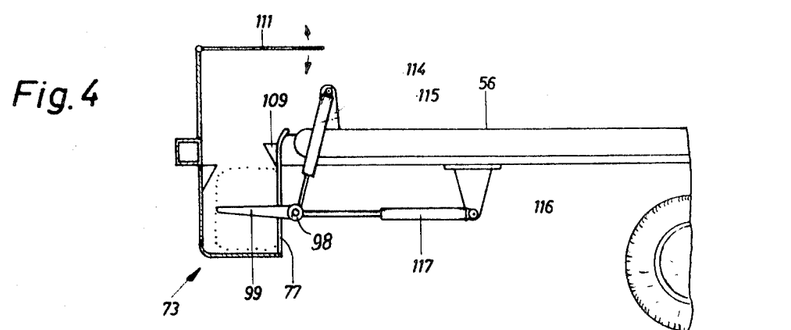
FIG. 4 is a view, similar to FIG. 3, illustrating another embodiment of the invention.

As shown in FIG. 4, a particularly good adaptation of the conveying speed of transverse conveyor 9 in conveyor duct 3, and of conveyor prongs 99 in guide trough 73, can be attained when prong support 98 is operatively connected with lifting fluid pressure actuators 115 and 117 which can be articulated on the exterior of loading wagon 52 on respective brackets 114 and 116.

Figure 15:
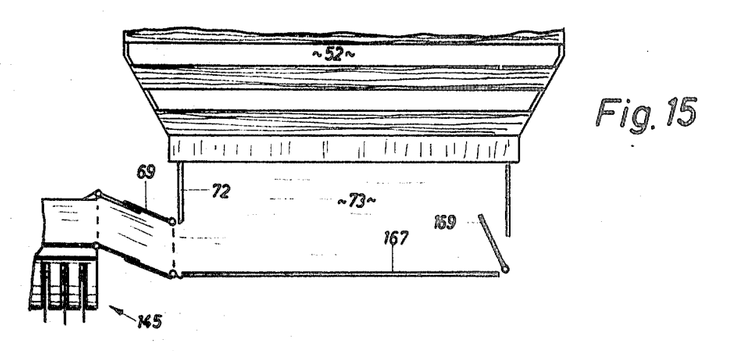
FIG. 15 is a somewhat schematic end elevation view of a modified embodiment of the guide trough, illustrating the same in a lowered position.

Control of prongs 99, or rather the lifting movement of the prongs, can also be effected by a clutch or control valve actuated in dependence on the amount of material supplied, for example by the pressure of the material on a pivoted flap 169 (FIG. 15). The flap can also be arranged in the range of either longitudinal sidewall of guide trough 73.

Figure 5:
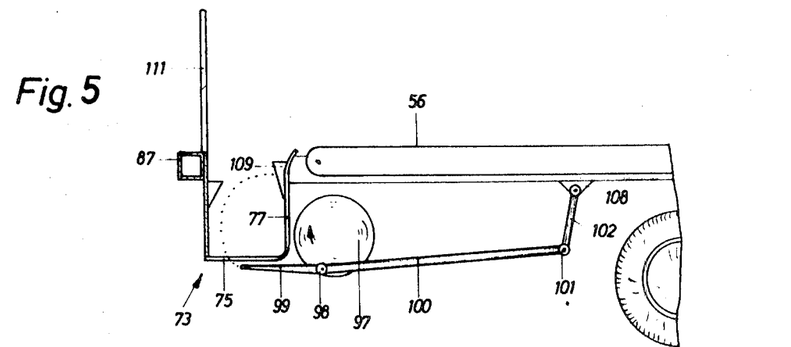
FIG. 5 is a view, similar to FIG. 3, of still another embodiment of the invention.

FIG. 5 illustrates a somewhat modified embodiment with a mechanical drive, and which differs from the embodiment shown in FIG. 3 in that prongs 99 do not penetrate through guide trough 73 above bottom wall 75 from the rear, but are first advanced below bottom wall 75 and, only after they have reached substantially their fullest extended position, do they enter guide trough 73 upwardly directly from the bottom through bottom wall 75 which, in this case, is designed as a slotted wall. With this arrangement, the portion of each revolution of crank disk 97 during which prongs 99 are in guide trough 73 can be reduced even further in a desired manner. The slotted bottom wall 75, which can form a bent extension of longitudinal sidewall 77, preferably is so designed that the individual metal strips are somewhat staggered vertically, and are so bevelled, that the introduction of a cord of material from the side is not hindered by projecting side edges of the individual metal strips.

Figure 6:
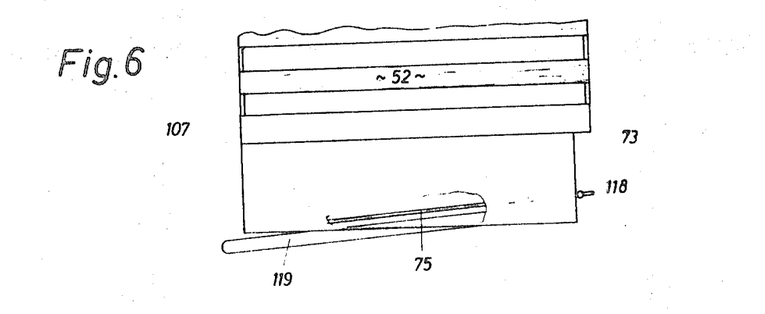
FIG. 6 is an end elevation view, partly broken away, illustrating a further embodiment of the invention.

As shown in FIG. 6, bottom wall 75 can be arranged to be pivoted on a pivot 118 and locked in various inclined positions. Alternatively, bottom wall 75 may be replaced by an endless conveyor belt 119 which can be driven in either direction. With this arrangement, it is possible to unload, to the side, bulk goods resting on the scraper bottom, for example, root vegetables, gravel, potatoes, coal, etc., and to charge a conveyor means positioned laterally of loading wagon 52, through guide trough 73. This design also makes it possible, particularly in the case of very delicate material, to convey the cord of material, discharged from conveyor duct 3 into guide trough 73, not only indirectly by the pushing effect of the following material but also directly and positively, thus preventing any damaging compression.

Figure 7:
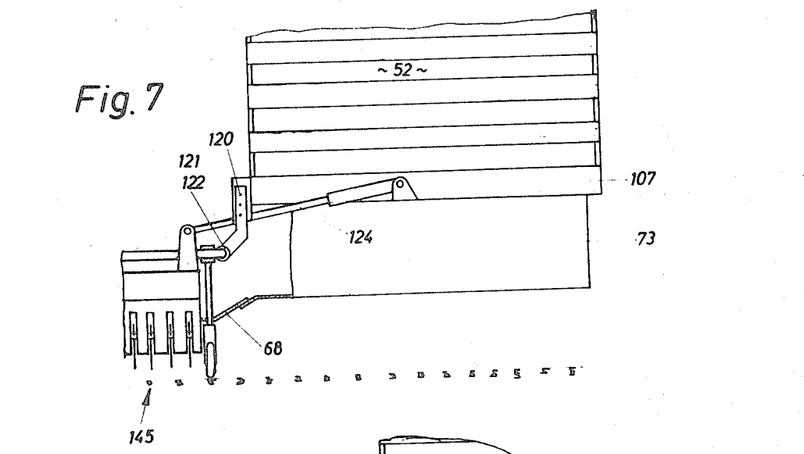
FIG. 7 is an end elevation view of a further modified embodiment in accordance with the invention.
Figure 8:
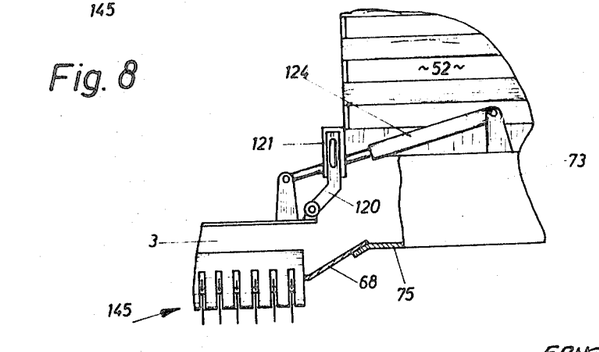
FIG. 8 is a view, similar to FIG. 7, illustrating another embodiment of the invention.

In the embodiment of the invention shown in FIG. 7, pivoted joints 122 are arranged on loading wagon 52 and serve to secure harvesting implement 145. These joints can be arranged in supports 120. In turn, supports 120 can be adjustable in guides 121, the supports being locked in adjusted position either by a corresponding locking device, guided in an oblong slot, or by individual predrilled bores which receive the locking means. To lift implement 145 in its driving position, loading wagon 52 is provided with a bracket which is engaged by a lifting fluid pressure actuator 124 (FIGS. 7 and 8) which is secured at its opposite end on the frame of harvesting implement 145. Lifting actuator 124 can be actuated by known motor-driven or manually operated hydraulic pumps, so that harvesting implement 145 can be raised from the driving position into a vertical orientation laterally of the loading chamber of loading wagon 52. Correspondingly, other hoisting devices may be used for this purpose, for example, cable winches or spindles. It will be clear that the entire harvesting implement 145 can be adjusted in height with respect to loading wagon 52 by guides 121 and the corresponding mounting of the supports engaging the latter, but that the lateral spacing between implement 145 and guide trough 73 always remains constant.

Figure 9:
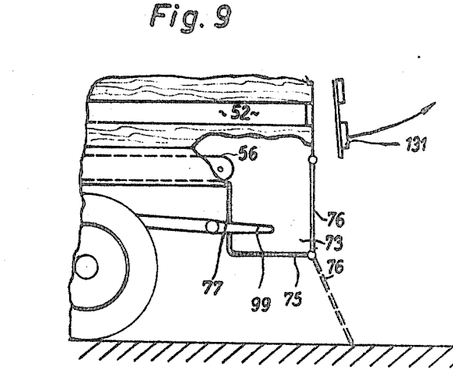
FIG. 9 is a somewhat schematic side elevation view, partly broken away, illustrating the guide trough arranged at the rear end of the loading wagon.

As can be seen from FIG. 9, it is also possible to attach guide trough 73 on the rear end of a scraper bottom 56 of the loading wagon 52, or of an automotive loading wagon, or of a commercial truck, delivery truck, etc. In FIG. 9, the conveyor device is not represented in all its details, but indicated only by the reference numeral 99, and can be arranged behind the rear axle under the rear end of the vehicle protected, in a manner corresponding approximately to FIG. 2, but in mirror image fashion. Rear wall 131 of the vehicle can be swung out in a known manner. In the arrangement illustrated in FIG. 9, rear wall 131 terminates approximately at the level of scraper bottom 56 and of the upper edge of sidewall 76 of guide trough 73. Sidewall 76 also can be lowered into the position indicated by broken lines, during unloading of the loading chamber.

Figure 10:
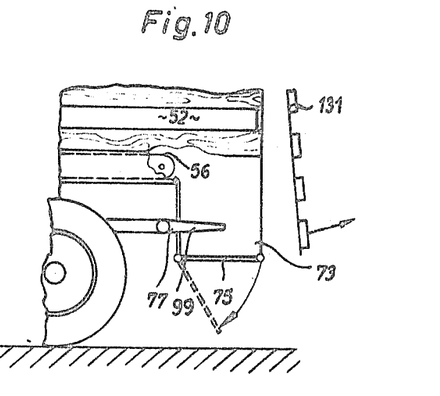
FIG. 10 is a view, similar to FIG. 9, illustrating a modification of the embodiment shown in FIG. 9.

Referring to FIG. 10, rear wall 131 is so designed that its bottom edge adjoins, in operating position, the rear edge of bottom wall 75 of guide trough 73, and can be swung up to the rear in the unloading position. If bottom wall 75 of trough 73 also is hinged, as represented in FIG. 10 in broken lines, the rear end of scraper bottom 56 can also be connected directly to a succeeding conveyor device during unloading of the loading vehicles, or with a loading device mounted behind the scraper bottom.

Figure 11:
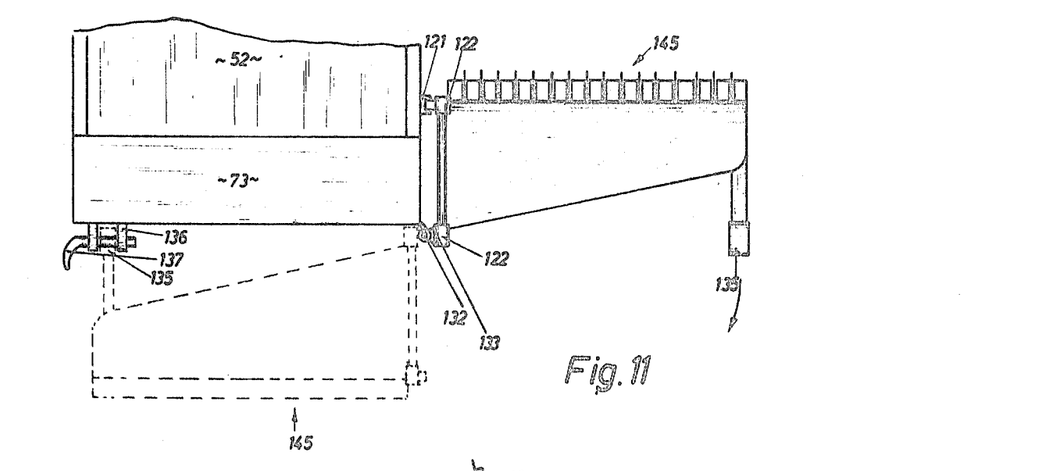
FIG. 11 is a plan view illustrating a swivel mounting of the harvesting element.
Figure 12:
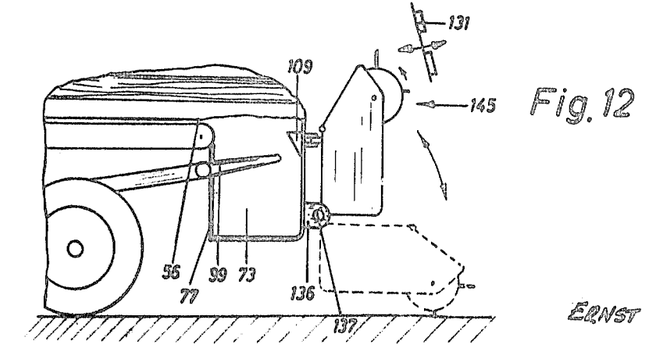
FIG. 12 is a partial elevation view, partly broken away, illustrating a further swiveling arrangement for the mounted harvesting element.

In order to be able to fold harvesting implement 45 not only upwardly about horizontal pivots 122 extending in the driving direction, but also laterally, an additional vertically oriented pivot 132 can be provided, in accordance with the invention, as shown in FIG. 11. After loading is completed, harvesting implement 145 can be disconnected from front guide 121 and turned about vertical pivot 132 so that implement 145 is behind the loading wagon in the position represented in FIG. 11 by broken lines. In this latter position, implement 145 can be flexibly connected with loading wagon 52 by a pin 137 inserted through an aperture lug 135 aligned with pivot 133, and which fits between two apertured ears 136 on wagon 52. As shown in FIG. 12, implement 145 can also be swung up about pivot 132 and pin 135 to a vertically oriented position and latched in such position. In this position, and with prongs 99 stationary in their uppermost position, the harvesting implement can be used also as an unloading implement, for example, for unloading the loading wagon laterally. This can be effected by attaching a power takeoff or an electric motor to the harvesting implement.

Figure 13:
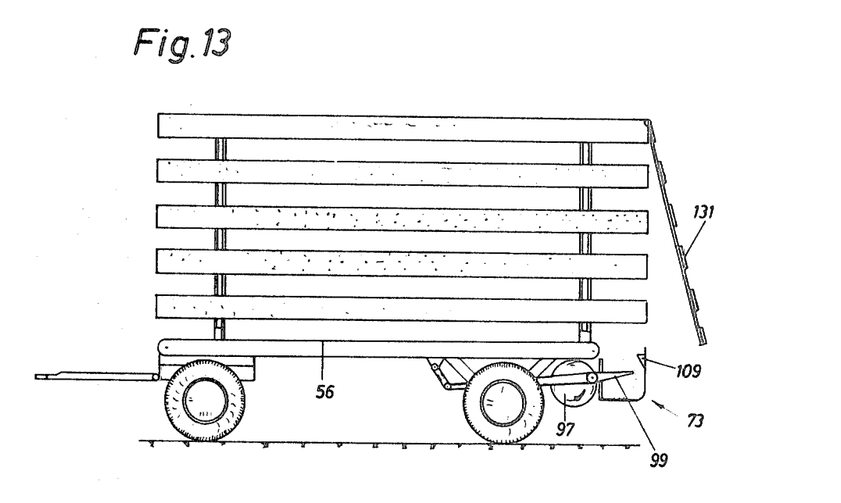
FIG. 13 is a side elevation view illustrating, somewhat schematically, the arrangement of the guide trough at the rear end of a loading wagon and the association of the driving mechanisms therewith.

In the embodiment of the invention shown in FIG. 13, guide trough 73 is arranged at the rear end of scraper bottom 56 of a two-axle loading wagon, and it can readily be seen that guide trough 73 and conveyor device 97, as well as the respective elements, can be very well arranged behind the rear axle of the wagon in a space-saving and protected manner and in such a way that no useful loading space is lost. Not only is a favorable weight distribution on the axles of the vehicle attained, but the loading device, even if it should not be used, does not form a hindrance in any way. In this way, any existing two-axle wagon can be transformed into a loading wagon of very great capacity, with lateral charging, by a simple subsequent attachment of the conveyor device, guide trough 73, and the harvesting implement 145, which latter is not shown in FIG. 13. If the wagon is to be used for other transportation purposes, it is merely necessary to make harvesting implement 145 detachable. However, the conveyor device and the guide trough 73 can remain on the wagon or it can be detached very easily therefrom. Naturally, it is advisable in the former case, to close the outlet end of guide trough 73 in a known manner by means of flap.

Figure 14:
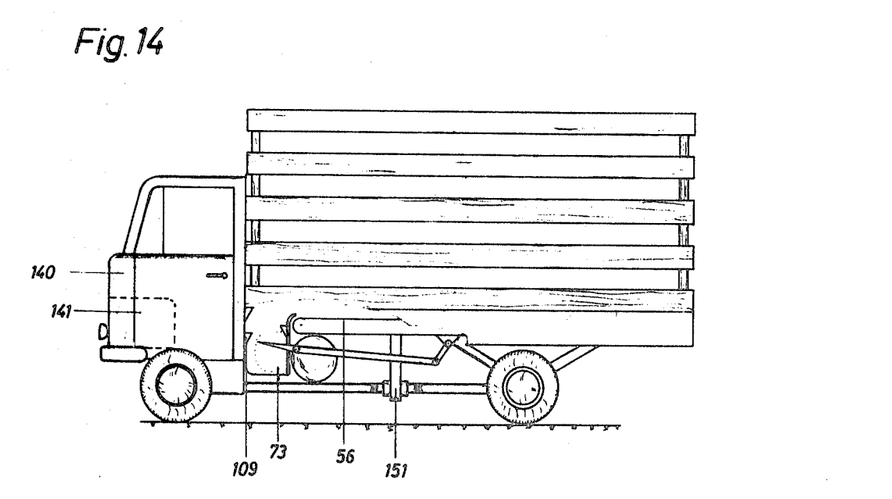
FIG. 14 is a somewhat schematic side elevation view illustrating the guide trough as mounted on an automotive type loading wagon.

FIG. 14 shows an arrangement of guide trough 73 and the harvesting implement (not shown) at the front end of the scraper bottom of an automotive loading wagon or of a correspondingly modified commercial truck. Guide trough 73 is arranged directly behind the front end wall of the loading chamber and the rear wall of the driver's cabin 140, this cabin being arranged above the front axle. This arrangement of the guide trough fits excellently into the total structure of an automotive harvester. It hinders neither the steering through the front axle of the vehicle nor the arrangement of the universal joint shafts extending to the front and rear axle from the drive. Furthermore, it does not hinder a favorable arrangement of motor 141. This arrangement also insures a favorable weight distribution on the front and rear axles of the vehicle.

If motor 141 is arranged, as represented, in the driver's cabin, either in front of or above the steerable front axle of the loading wagon, in accordance with the invention, the gearing extending rearwardly from the motor can be so designed that the universal joint shafts for the axle drives can be connected to extend to the front and to the rear from a low part of the gearing. The rear universal joint shaft or Cardan shaft, can be secured, if necessary, on an intermediate bearing 51 on which can be arranged gear elements for driving the material receiving and conveyor device.

In the embodiments of the invention shown in FIGS. 15 through 18, guide trough 73 has a bottom wall 167 which can be displaced vertically between longitudinal sidewalls 76 and 77. Due to this vertically adjustable bottom wall 167, additional conveyor elements are not necessary, which means considerable savings in construction costs and dead weight. FIG. 15 illustrates the lowest position of bottom wall 167, which is connected, by a downwardly inclined intermediate duct, with the transverse conveyor duct of harvesting implement 145. The bottom edge of a cutting blade 72 is arranged next to the exit end of the intermediate duct and at about the level of the upper baffle plate 69. The switching elements for effecting the lifting movement of displaceable bottom wall 167 are actuated by a flap 169.

Figure 16:
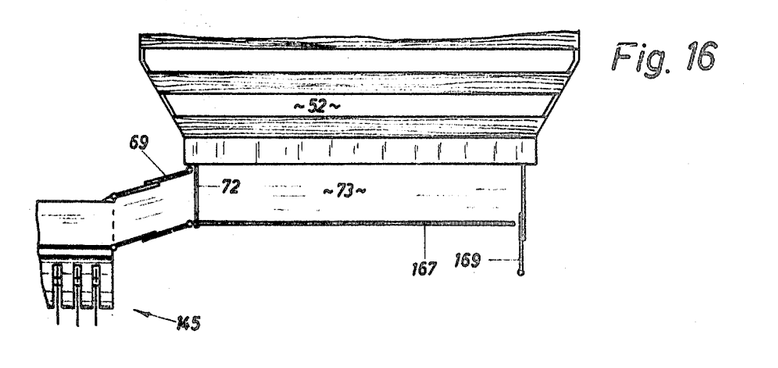
FIG. 16 is a view similar to FIG. 15 illustrating the guide trough in a raised position.

FIG. 16 illustrates the uppermost position of displaceable bottom wall 167, in which the bottom wall 167 is arranged slightly higher than the bottom edge of blade 72. It can be seen that the cord of material contained in the intermediate duct and in guide trough 73 is severed by blade 72 during lifting movement of bottom wall 167. In the position shown in FIG. 16, the intermediate duct is closed temporarily by blade 72, so that newly arrived material is temporarily more compressed in the intermediate duct and also in the transverse conveyor duct of harvesting implement 145. Naturally, lifting of bottom wall 167 will be performed as rapidly as possible, and the bottom wall will be lowered immediately after reaching the topmost position, so that the conveyance of an additional cord of material into guide trough 73 can be effected without any substantial interruption.

Figures 17, 18:
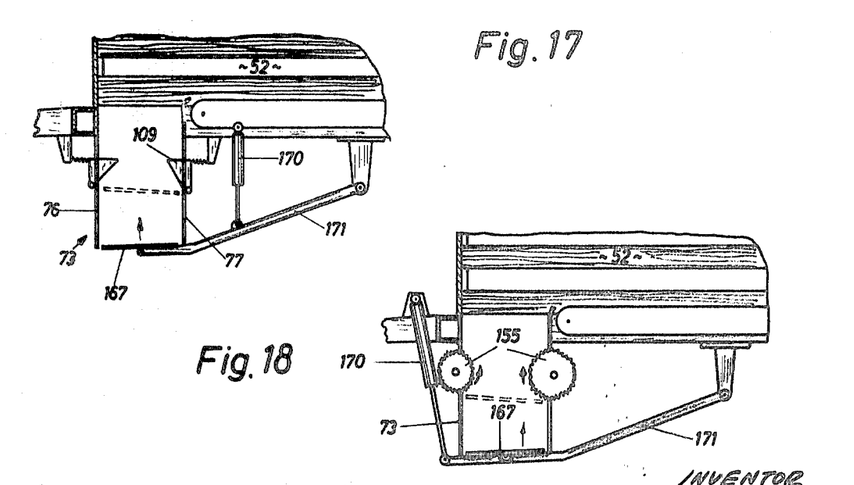
FIG. 17 is a sectional view illustrating still another embodiment of the invention.
FIG. 18 is a view similar to FIG. 17, but illustrating a modification of the embodiment shown in FIG. 17.

Instead of the barbs mentioned previously, there can be used star rolls 155 as shown in FIG. 18, and which are so controlled by known ratchet gears that they can turn only in the direction of the arrows under the friction of the material during lifting of the material, but cannot turn in the reverse direction. Thus, the cord of material is prevented from sinking down after it has reached its position for discharge onto scraper bottom 56.

As shown in FIGS. 16 and 17, lifting of bottom wall 167 can be effected in a simple manner by a lifting actuator 170 which is so articulated, either behind guide trough 73 or in front thereof, on the chassis of loading wagon 52 that it can raise or lower bottom wall 167, which is mounted on rocker arm or arms 171 which can be swung by actuator 170 pivoted to arm or arms 171. The method of operation of this embodiment of the invention follows logically from the operation of the embodiments described above.

What is claimed is:

1. In a loading wagon having longitudinal and transverse beams and a conveyor duct extending longitudinally thereof and chargeable laterally of the wagon with material picked up from a longitudinally extending path laterally adjacent the driving track of the loading wagon: the improvement comprising, in combination, a substantially U-shaped guide trough, open at the top, extending laterally completely across the width of said wagon, at an entrance of said conveyor duct, and having at least front and rear walls bridged by a bottom wall; and conveyor prongs extendable into said guide trough laterally thereof and operable to lift material, charged into said guide trough through an inlet end thereof opening laterally of said loading wagon, for discharge through the open top of said guide trough into said wagon across substantially the entire width of said wagon.

2. In a loading wagon, the improvement claimed in claim 1, including conduit means supplying material to one end of said guide trough; and a substantially closed end wall at the opposite end of said guide trough.

3. In a loading wagon, the improvement claimed in claim 1, in which one of said front and rear walls is formed with slots through which said conveyor prongs are extendable into said guide trough and retractable from the latter.

4. In a loading wagon, the improvement claimed in claim 3, in which the other of said front and rear walls is mounted directly on a crossbeam of said loading wagon.

5. In a loading wagon, the improvement claimed in claim 1, including a roll rotatably mounted on means adjacent the material receiving end of said guide trough.

6. In a loading wagon, the improvement claimed in claim 5, in which said roll is rotatable about a vertical axis.

7. In a loading wagon, the improvement claimed in claim 5, in which said roll is rotatable about a horizontal axis.

8. In a loading wagon, the improvement claimed in claim 1, including a prong support extending laterally of said loading wagon and having said prongs secured thereon; and a pair of laterally spaced crank disks rotatable mounted on said wagon, said prong support being secured to said crank disks.

9. In a loading wagon, the improvement claimed in claim 8, including a control arm having one end fixedly secured to said prong support; a swivel arm having one end pivotally connected to the opposite end of said control arm; and a journal pivotally connecting the opposite end of said swivel arm to said loading wagon; said control arm cooperating with said crank shaft to maintain constantly a substantially horizontal position of said prongs.

10. In a loading wagon, the improvement claimed in claim 1, including barbs in the form of wedge shaped positioned on said front and rear walls in the path of material being lifted by said prongs, said barbs having upwardly and outwardly sloping surfaces and being arranged adjacent the opened upper end of said guide trough.

11. In a loading wagon, the improvement claimed in claim 1, including star wheels rotatably mounted adjacent each of said front and rear walls of said guide trough, for rotation about substantially horizontal axes, and extending into said guide troughs, said star wheels being rotatably mounted adjacent the opened top of said guide trough; and means operatively associated with said star wheels and providing for rotation thereof in a direction such that the portions of the star wheels within the conveyor trough can move upwardly, said means preventing reverse rotation of said star wheels.

12. In a loading wagon, the improvement claimed in claim 1, including a material cutting blade positioned adjacent the material receiving end of said guide trough and adjacent the conveyor prong nearest said material receiving end.

13. In a loading wagon, the improvement claimed in claim 8, including lifting actuators each pivotally connected at one end to said loading wagon and at the opposite end to said prong support.

14. In a loading wagon, the improvement claimed in claim 3, in which said conveyor prongs penetrate through said slotted wall directly above said bottom wall and, within said guide trough, move, at first, substantially parallel to said bottom wall and then upwardly in said guide wall; said conveyor prongs retracting through said slotted wall out of said guide trough at the end of their conveying stroke.

15. In a loading wagon, the improvement claimed in claim 3, in which said bottom wall is formed with slots aligned with the slots in said one wall; said conveyor prongs initially being extended below said bottom wall and then moving upwardly through the slots in said bottom wall and in said one wall into the guide trough; said conveyor prongs being retracted from said guide trough through said one slotted wall adjacent the upper end of the latter.

16. In a loading wagon, the improvement claimed in claim 1, in which the velocity of movement of said conveyor prongs within said guide trough is greater than the velocity of movement of said conveyor prongs outside said guide trough.

17. In a loading wagon, the improvement claimed in claim 1, including a switching means operable periodically to interrupt movement of said conveyor elements; and control means for said switching means operable by the material to be conveyed.

18. In a loading wagon, the improvement claimed in claim 1, including means pivotally mounting one end of said bottom wall for swinging of said bottom wall about a substantially horizontal axis; and means operable to lock said bottom wall in adjusted position.

19. In a loading wagon, the improvement claimed in claim 1, including driven conveyor means positioned in the range of the bottom wall of said trough.

20. In a loading wagon, the improvement claimed in claim 1, including a hinge connection on said wagon for attachment of a harvesting implement to said wagon in laterally spaced relation thereto, said hinge connection providing for swinging of an attached harvesting implement upwardly thereabout into an inoperative position.

21. In a loading wagon, the improvement claimed in claim 1, in which said wagon has a scraper bottom in said laterally chargeable conveyor duct; and drive means for said conveyor prongs positioned beneath said loading wagon.

22. In a loading wagon, the improvement claimed in claim 1, in which at least one of said walls of said guide trough is pivotally mounted for swinging about a substantially horizontal axis.

23. In a loading wagon, the improvement claimed in claim 22, in which said wagon has a body including a rear wall pivotally mounted at its upper end for swinging movement about a substantially horizontal axis; said rear wall of said wagon constituting one of said front and rear walls of said guide trough.

24. In a loading wagon, the improvement claimed in claim 20, including a second hinge connection connecting said first-mentioned hinge connection to said loading wagon and providing for turning of a harvesting implement connected to said first-mentioned hinge connection about a vertical axis into a position behind said loading wagon; and means operable to lock a harvesting implement in said position.

25. In a loading wagon, the improvement claimed in claim 1, in which said loading wagon has a scraper bottom extending along said laterally chargeable conveyor duct; said guide trough being mounted on said loading wagon above said beams and substantially at the level of said scraper bottom.

26. In a loading wagon, the improvement claimed in claim 1, in which said bottom wall is vertically adjustable relative to said front and rear walls; and lifting means connected to said loading wagon and engaged with said bottom wall and operable to effect vertical adjustment of said bottom wall.

27. In a loading wagon, the improvement claimed in claim 1, in which said loading wagon is an automotive loading wagon having a driver's cabin at its front end, and a scraper bottom extending along said laterally chargeable conveyor duct; said guide trough being mounted on said wagon between said driver's cabin and the forward end of said scraper bottom.